United States Patent

[11] 3,614,581

| [72] | Inventor | Emerson L. Frost<br>Manasquan, N.J. |
|---|---|---|
| [21] | Appl. No. | 10,166 |
| [22] | Filed | Feb. 10, 1970 |
| [45] | Patented | Oct. 19, 1971 |
| [73] | Assignee | The United States of America as represented by the Secretary of the Army |

[54] POWER CONVERSION SYSTEM
5 Claims, 4 Drawing Figs.

[52] U.S. Cl. .................................................. 320/6,
320/1, 320/21, 321/2
[51] Int. Cl. .................................................. H02j 7/00
[50] Field of Search.......................................... 320/39,
DIG. 2, 40, 21, 1; 321/2, 49; 323/83; 307/72-74,
81, 85, 149

[56] References Cited
UNITED STATES PATENTS

| 3,146,391 | 8/1964 | Walker | 320/1 |
| 2,258,303 | 10/1941 | Schmidt et al. | 320/1 |
| 2,464,279 | 3/1949 | Zarem et al. | 320/1 |
| 2,490,733 | 12/1949 | Kennedy | 320/1 X |
| 3,090,904 | 5/1963 | Jensen | 320/22 |
| 3,252,070 | 5/1966 | Medlar et al. | 320/DIG. 2 UX |
| 3,305,755 | 2/1967 | Walsh | 320/DIG. 2 UX |
| 3,497,805 | 2/1970 | Camnitz | 320/1 X |
| 3,376,488 | 4/1968 | Walsh | 320/DIG. 2 UX |

FOREIGN PATENTS

| 429,108 | 5/1935 | Great Britain | 320/39 |

Primary Examiner—J. D. Miller
Assistant Examiner—John M. Gunther
Attorneys—Harry M. Saragovitz, Edward J. Kelly, Herbert Berl and Daniel D. Sharp

ABSTRACT: This invention relates to a power conversion system wherein energy from a high-voltage direct current source is caused to charge a relatively small high-voltage capacitor and the energy stored in said capacitor is transferred periodically through a resonant discharge circuit and rectifier to supply a low-voltage direct current to a load which may, for example, be a large capacitor or a battery whose charge is to be maintained relatively constant.

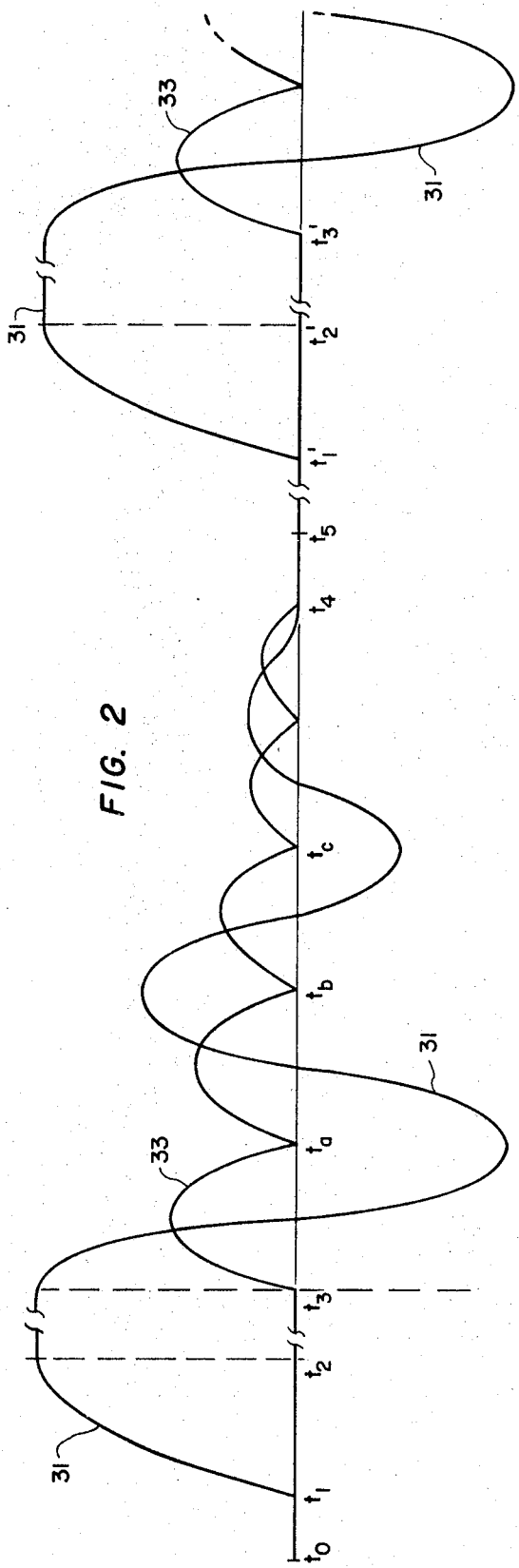
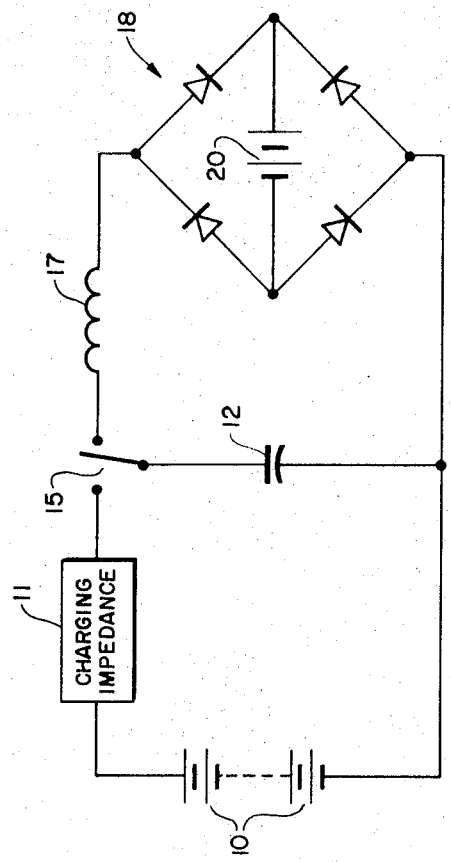

INVENTOR,
EMERSON L. FROST

POWER CONVERSION SYSTEM

The invention described herein may be manufactured, used, and licensed by or for the Government for governmental purposes without the payment to me of any royalty thereon.

BACKGROUND OF THE INVENTION

In certain applications, it is desirable to transform the output of high-voltage sources, for example, ionic sources such as atomic batteries and gas dynamic generators, to reasonable direct current levels for powering conventional circuitry using such components as transistors and other solid-state devices. Attempts to supply the high-voltage directly to conventional circuits, such as transistorized circuits, poses considerable problems since the components used in such circuits are subject to burnout or destruction by such high voltage. The direct current to alternating current to direct current systems using transformers for voltage reduction, whether used in resonant or nonresonant circuits, often are impractical for high voltages since high-voltage transformers are relatively expensive, bulky and heavy. Furthermore, direct current to direct current systems using direct current inverters are cumbersome and particularly unsuitable for mobile military applications.

SUMMARY OF THE INVENTION

In accordance with the subject invention, a high-voltage source is caused to charge periodically a charging capacitor to a voltage which, for example, may be substantially equal to that of the voltage source. The charge stored in this first capacitor is applied, at periodic intervals, to a resonant discharge circuit which includes said charging capacitor, an inductor (either distributed or lumped) and either a second capacitor of capacitance large compared with that of the charging capacitor or a battery to be kept charged. During the discharge cycle a substantially sinusoidal damped transient voltage and current is produced and the oscillatory current in the resonant discharge circuit, after rectification is applied to the load (either the aforesaid second capacitor or the battery). The load may be positioned in the diagonal of a full wave rectifier connected in circuit with the inductor and charging capacitor of the resonant discharge circuit. For each operating discharge one-half cycle of the resonant discharge circuit, that is, while the charge on the charging capacitor is connected to the load through the resonant discharge circuit, a certain voltage increment appears at the load. The magnitude of the load voltage depends not only on the duration of each operating discharge cycle and on the voltage to which the charging capacitor is charged but also upon the number of such operating discharge cycles.

DESCRIPTION OF THE DRAWINGS

FIG. 1 is a schematic diagram showing a first embodiment of a power conversion system according to the invention;

FIG. 2 are waveforms illustrating the operation of the system of FIG. 1;

DETAILED DESCRIPTION OF THE PREFERRED EMBODIMENT

Figure 3:
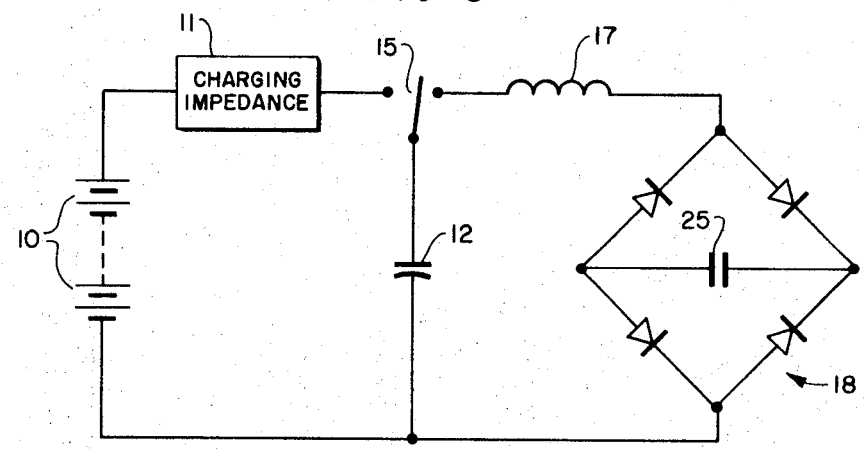
FIG. 3 is a schematic diagram showing a second embodiment of a power conversion system.

Referring to FIG. 1, a direct current high-voltage source 10 is shown which can be connected in circuit with a charging capacitor 12 when the switch 15 is in the left-hand position. The switch 15 has two distinct operating conditions and an inoperative condition, as will be explained later. In some cases, a charging impedance 11 in series with the high-voltage source 10 may be desirable to control the charging time of capacitor 12. The power conversion system further includes an inductor 17, a rectifier 18 and a load 20 in the form of a battery to be charged. Initially, at time $t_0$, switch 15 is in the mid position and, as indicated by the waveform 31 of FIG. 2, the voltage across the charging capacitor 12 is substantially at the reference voltage, which, if the system is grounded, may be 0 volts. When, at time $t_1$, the switch 15 is operated to the left-hand position, the capacitor 12 commences to charge exponentially to the potential of the high-voltage source 10, if the charging impedance 11 is essentially resistive; if the charging impedance 11 is inductive, the capacitor 12 will charge sinusoidally. When the charging impedance is inductive, the charging circuit is a resonant circuit. At some time $t_2$, following closure of the charging loop, the switch 15 is open, that is, operated to the mid position. The voltage on capacitor 12 remains substantially constant, except for a slight decrease owing to leakage of charge during the quiescent interval (that is during the time $t_2$ to $t_3$ that the switch of FIG. 1 is in the mid position). When, at time $t_3$, the switch 15 is moved to the other operating position, that is the right-hand position in FIG. 1, the capacitor 12 is connected in circuit with an inductor 17 to form a resonant discharge circuit having a decrement depending upon the Q of the circuit. The voltage across capacitor 12 then oscillates about the reference voltage level following approximately a sinusoidal variation with the envelope decaying linearly, as shown by the waveform 31 of FIG. 2. If the absolute value of voltage at time $t_3$ is unity, than the corresponding absolute value of voltage at times $t_a$, $t_b$ and $t_c$ would be $1-\delta$, $1-2\delta$, and $1-3\delta$, respectively. The waveform of the current flowing through the series circuit including charging capacitor 12, inductor 17 and the load 20, after rectification is shown by the waveform 33 of FIG. 2 and, like the voltage waveform 31, decays linearly. At time $t_4$, the transient is completely damped out owing to the nature of the damping process. The switch 15 should not open prior to time $t_4$ in order to avoid possible switch damage during a current cycle and to avoid reduction of efficiency to $Q^2/2C$ of the inadequate charge transfer. It is possible, of course, to open switch 15 at time $t_4$ or at any time $t_5$ subsequent to time $t_4$, as indicated in FIG. 2. At time $t_5$, the switch 15 is returned to the mid position, thus ending a cycle of operation. With each oscillation, an incremental charging current is supplied to charge the battery 20. The number of half cycles per switching cycle $t_1$ to $t_5$ will be proportional to the voltage of the source. The exact magnitude of the charging current depends upon the number of half cycles of oscillation.

A new cycle of operation is accomplished by moving the switch 15 to the left-hand position, at time $t_1'$, thereby recharging capacitor 12 from the high-voltage source. At the appropriate interval $t_3'$, the switch 15 is again moved to the right-hand position and another damped oscillation ensues until such time as the switch is returned to the mid position. In practice, the mechanical switch 15 shown in FIG. 1, could be replaced by an electronic switch. The energy of the capacitor 12 is equal to    and the energy added to the battery 20 per half cycle is $\Delta Q V_B$ where $\Delta Q$ is the increment of charge transferred during that half cycle (a decreasing amount for each successive half cycle) and $V_B$ is the battery voltage. The battery voltage $V_B$ is equal to half of the first half cycle decrement $\delta$ of the resonant discharge circuit. The ultimate 100 percent energy transfer from the charging capacitor 12 to the battery 20 occurs when the initial voltage is an integral number of the first half cycle voltage decrement $\delta$. A maximum residual charge remains on charging capacitor 12 when the voltage across capacitor 12 is equal to $\delta/2$. These maxima are $\delta/2$ volts and represent very small energies for $\delta$ much less than the maximum initial voltage on the charging capacitor. Similarly, the number of half cycles for the maximum discharge to occur is equal to the ratio of the maximum initial voltage on the capacitor and $\delta$.

In FIG. 3 a circuit is shown in which the battery load of FIG. 1 is replaced by a second capacitor 25. The remaining circuit components of FIG. 3 can be identical to those shown in FIG. 1 and are represented by the same reference numerals as in FIG. 1. It is possible, of course, that changes in component values and in switching times may be necessary when changing from a battery load 20 to a capacitive load 25. If the decrement in the absolute value of the peak voltage on the capacitor 12 for the first half cycle is $\delta$ volts, it can be shown from linear theory that the voltage on the load capacitor 25, which initially is without charge, attains $\delta$ volts; with the charge and energy component conserved, the load capacitor 25 is equal to $2-\delta/\delta$.

From this result, the following absolute peak voltage values for the first five successive half cycles can be determined to be:

| No. of half cycle: | Voltage on charging capacitor 12 | Voltage on load capacitor 25 |
|---|---|---|
| 1 | 1 | 0 |
| 2 | $1-\delta$ | $\delta$ |
| 3 | $1-4\delta+2\delta^2$ | $2\delta-2\delta^2$ |
| 4 | $1-9\delta+12\delta^2-4\delta^3$ | $3\delta-8\delta^2+4\delta^3$ |
| 5 | $1-16\delta+40\delta^2-32\delta^3+8\delta^4$ | $4\delta-20\delta^2+24\delta^3-8\delta^4$ |

Figure 4:
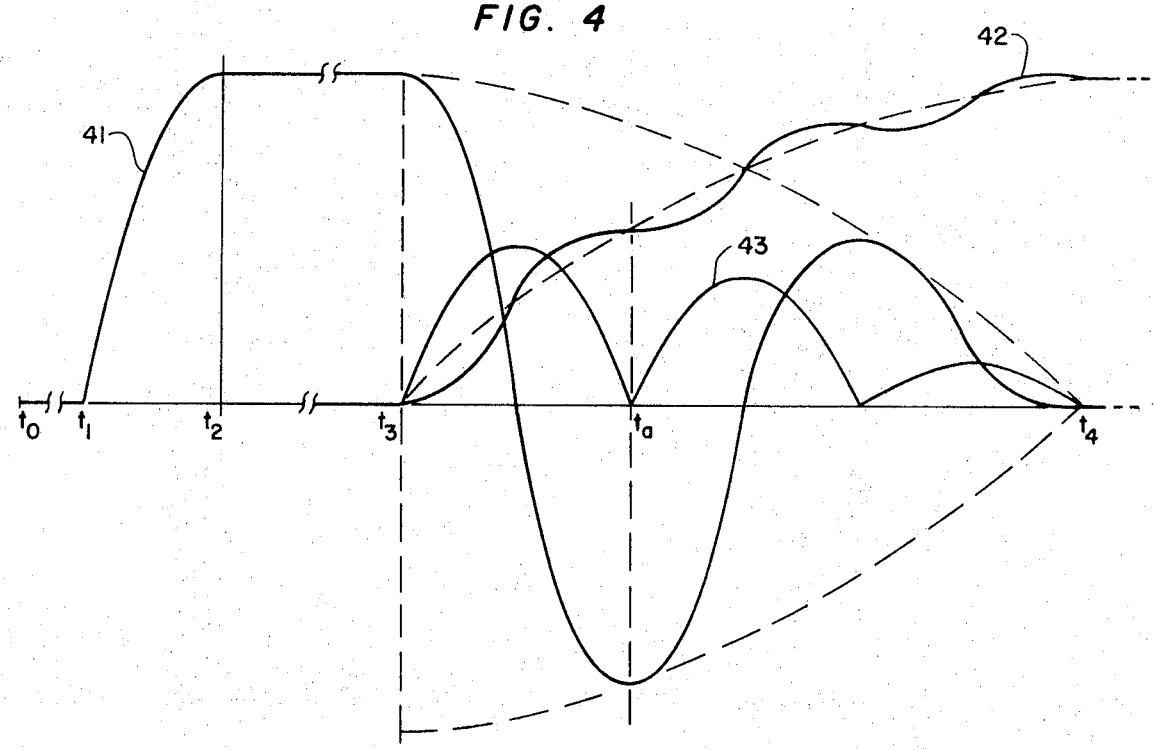
FIG. 4 are waveforms illustrating the operation of the device of FIG. 3.

In a similar fashion, the values of voltage on the load capacitor 25 can be shown to vary sinusoidally, as indicated by the dashed line envelope in FIG. 4. The waveforms of voltage across capacitors 12 and 25 and the current in both capacitors 12 and 25 are shown in FIG. 4 by the waveforms 41, 42 and 43, respectively. The time interval $t_3$ to $t_a$ illustrated is equal to $\cos^{-1}(1a-\delta)=30°$. The initail energy of capacitor 12, neglecting incidental losses is completely transferable to load capacitor 25. This is true also whenever $\cos(1-\delta)$ is an even submultiple of 180°. Other values of $(1-\delta)$ will result in a residual charge on capacitor 12; this residual charge is very small, however, for a reasonable number of discharge cycles.

If capacitor 25 is partly charged at the closing of the switch 15 to the right, the general sine-cosine envelope conditions prevail but with a subsequent initial phase shift and, therefore, fewer discharge half cycles. In the case of large initial charge on capacitor 25 and small decrement $\delta$, one observes (from $\sin\theta \to 0$ as $\theta \to 0$) that the voltage envelope of capacitor 12 approaches a straight line. Stated another way, the operation becomes similar to the charging of a battery of slowly varying voltage.

This invention is not limited to the particular details of construction, materials and processes described, as many equivalents will suggest themselves to those skilled in the art. It is desired, accordingly, that the appended claims be given a broad interpretation commensurate with the scope of the invention within the art.

What is claimed is:

1. An energy conversion system comprising a high-voltage direct current source, a charging capacitor, switching means including means for connecting said charging capacitor to said source to charge said capacitor from said source during a first interval; and a series resonant discharge circuit including said charging capacitor, an inductor, a rectifier, and a load; said switching means further including means for discharging said charging capacitor through said resonant discharge circuit during a second interval.

2. An energy conversion means according to claim 1 wherein said load is a battery.

3. An energy conversion means according to claim 1 wherein said load is a second capacitor the capacitance of which is large compared to the capacitance of said charging capacitor.

4. An energy conversion system according to claim 1 further including a charging impedance combining with said charging capacitor to comprise a resonant charging circuit.

5. An energy conversion system according to claim 1 wherein said switching means is cycled to periodically charge said charging capacitor and transfer the energy stored in said charging capacitor to said load.